United States Patent [19]

Toyoshima

[11] 4,109,104
[45] Aug. 22, 1978

[54] VOCAL TIMING INDICATOR DEVICE FOR USE IN VOICE RECOGNITION

[75] Inventor: Toshihiko Toyoshima, Tokyo, Japan

[73] Assignee: Xerox Corporation, Stamford, Conn.

[21] Appl. No.: 698,651

[22] Filed: Jun. 22, 1976

[30] Foreign Application Priority Data

Aug. 15, 1975 [JP] Japan .............................. 50-099364

[51] Int. Cl.² .............................................. G10L 1/02
[52] U.S. Cl. .............................. 179/1 SD; 179/2 DP; 179/6 R
[58] Field of Search ................ 179/1 SB, 1 SD, 1 SE, 179/2 DP, 2 AM, 1 SA; 340/69

[56] References Cited

U.S. PATENT DOCUMENTS

| | | | |
|---|---|---|---|
| 3,501,592 | 3/1970 | Walman | 179/6 R |
| 3,509,280 | 4/1970 | Jones | 179/1 SB |
| 3,737,580 | 6/1973 | Poza | 179/1 SB |
| 3,883,850 | 5/1975 | Martin | 179/1 SA |
| 4,016,540 | 4/1977 | Hyatt | 340/172.5 |

*Primary Examiner*—Thomas W. Brown
*Assistant Examiner*—E. S. Kemeny
*Attorney, Agent, or Firm*—James J. Ralabate; Sheldon F. Raizes; Irving Keschner

[57] ABSTRACT

A vocal timing indicator for use in voice recognition systems. The timing indicator provides a visual or audible signal to a user to mark the beginning of the time period in which the user is to speak into the microphone associated with the system, thereby ensuring that the proper input signals are used by the system to determine speaker identity or to assist in the recognition of the words uttered.

5 Claims, 3 Drawing Figures

VOCAL TIMING INDICATOR DEVICE FOR USE IN VOICE RECOGNITION

BACKGROUND OF THE INVENTION

This invention relates to a vocal timing indicator device for use in voice recognition.

In memorizing and recognizing a voice, it has been the general practice to have a speaker talk to a microphone, shape the voice by an electronic process, and memorize the shaped characteristics in a computer or compare the characteristics with previously stored information. Therefore, the utterance of the input voice should be timed at a suitable point since otherwise the recognition device may pick up other noises thereby failing to memorize and recognize the given voice or do so correctly. Various attempts have thus far been made to avoid this problem, for example, reduction of the amplitude of the microphone amplifier such that it does not pick up extraneous noises; utilization of a unidirectional microphone or a noise box to prevent errors or provision of a switch on the microphone and requiring the utterance of the voice after actuating the switch when a vocal signal is received from an operator. However, these methods are disadvantageous in that they always require attendance of an operator. Particularly, it is difficult to take timings with a noise box and almost impossible to receive a sign from a distant place. In addition, the cognition system is apt to malfunction due to switching noises, and efficient use of time is prohibited since the cognition system or computer is kept in a stand-by state for extended periods of time.

SUMMARY OF THE INVENTION

The present invention contemplates elimination of the foregoing and other difficulties by sending a timing signal from the computer to the speaker so that the speaker can utter a voice in an accurate timing interval thereby ensuring efficient use of time without causing malfunction of the cognition system.

DESCRIPTION OF THE PREFERRED EMBODIMENTS

Figure 1:
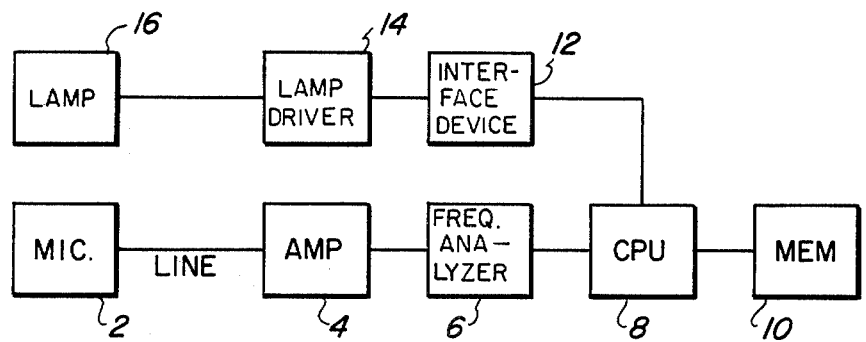
FIG. 1 is a block diagram showing one embodiment of the invention.

FIG. 1 shows a microphone 2 connected to an amplifier 4 which amplifies the signals produced by the microphone 2. A frequency analyzer, which may be of conventional design is connected to receive signals from amplifier 4, and to provide input signals to a central processor 8 which has associated therewith a memory 10 for storing signals operated upon by the central processor 8.

Also connected to the central processor 8 is an interface device 12, the output of which is applied to a lamp driver 14 to drive and illuminate a lamp 16.

In operation, a voice uttered by a speaker toward the microphone 2 is analyzed by frequency analyzer 6 and the processing unit 8 produces an output with vocal characteristics such as results of spectrum analysis, format information and pitch information, to store them in the memory device 10. It is usual practice to identify the voice by reading out voice characteristics from the memory 10 into the computer 8 for comparison with the voice uttered by the speaker.

According to the invention, a timing signal is sent out from the processing unit CPU 8 to signal the speaker that the proper timing interval for speaking has been initiated. The output signal is decoded by the lamp driving interface 12 to drive and illuminate the lamp 16 through the driving circuit 14. That is to say, a vocal timing signal is given to the speaker by a visual sign to utter a voice as soon as the speaker sees it. According to the present invention, the processing unit CPU 8 is actuated simultaneously with or with a slight time lag from the lighting of the lamp 16, so that it is possible to reduce the standby time of the computer or processing unit CPU 8 and the speaker can speak clearly to aid in reduction of cognition failures due to noises as well as the necessity of having an operator to monitor and signal a that the vocal timing interval has been initiated.

Figure 2:
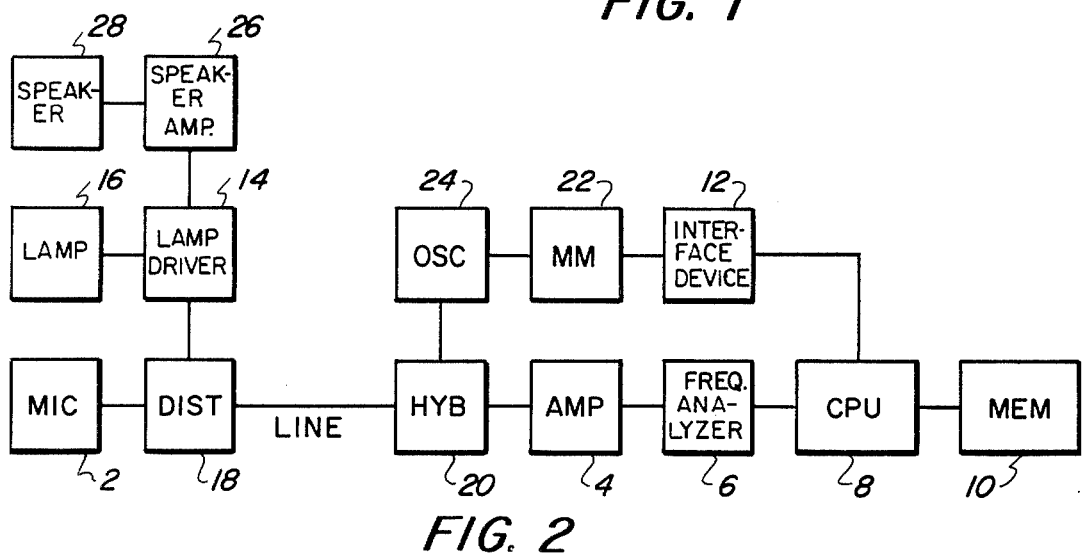
FIG. 2 is a block diagram showing a second embodiment of the invention.

In the embodiment of FIG. 1, the lamp circuit line and the microphone line are provided separately but a single common line may be used as shown in the embodiment of FIG. 2.

In FIG. 2, a microphone is again shown at 2, connected to a distributing circuit which serves merely to divide the microphone and timing signals to the lamp driver, since in this embodiment both signals may be carried on a common line. At the other end of the line is a hybrid circuit 20, the function of which is to interface the microphone and timing signals. An amplifier 4 is connected to the hybrid circuit and also to a frequency analyzer 6. The output of the frequency analyzer is connected to a central processor 8 having a memory 10, similarly as in FIG. 1. An interface 12 is connected to the central processor to receive timing signals which are passed to a monostable multivibrator 22 and to an oscillator 24. The oscillator output is passed to the hybrid circuit 20 to be transmitted over the line to the distributing circuit 18 and ultimately to either or both of a lamp driver 14 or a speaker amplifier 26 or audio loudspeaker 28, respectively.

Figure 3:
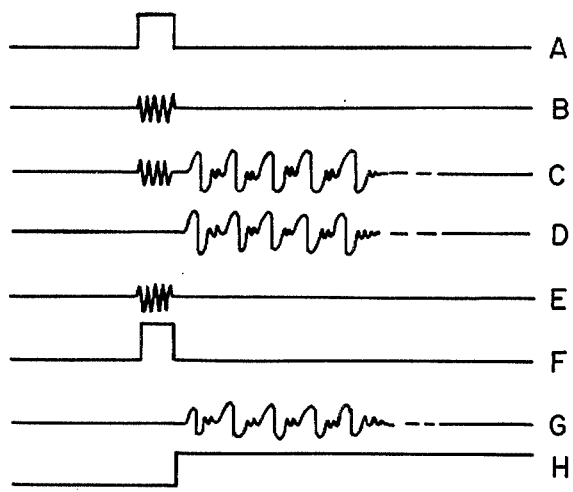
FIG. 3 is a timing diagram illustrating certain waveforms in portions of the embodiment of FIG. 2.

FIG. 3 shows waveforms at selected points of the circuit of FIG. 2 and is of aid in understanding that circuit. Waveform A is the output of the monostable multivibrator 22, and the output of oscillator 24 is shown at B. The line signal is shown at C and D is a representation of the microphone output. The output of the distributing circuit 18 is shown at E and the lamp driver 14 output is shown at F. G represents the output of hybrid circuit 20 and H is the voice input timing signal for the central processor 8.

In the operation of this embodiment, a vocal timing signal is fed from the processing unit 8 to the interface 12, actuating the mono-stable multivibrator 22 for a predetermined time period by the output of the interface 12 to produce an output as at A of FIG. 3. This output actuates the oscillator 24 the output B of which is fed to the line through the hybrid circuit 20, and the distributing circuit 18 at the terminal end selectively picks up only the output frequency of the oscillator 24 to produce a signal to the lamp driving circuit 14. The lamp 16 is lit for a predetermined time period by this signal. The speaker utters a voice toward the microphone 2 upon seeing the illuminated lamp. Upon extinction of the output of the monostable multivibrator 22 as at H of FIG. 3, the processing unit 8 is actuated to commence the timing for receiving the vocal signal in the processing unit CPU, thereby reducing stand-by time and at the same time preventing malfunction of the processing unit CPU due to spurrious noise inputs from the microphone.

In the foregoing description, the speaker is notified of the vocal timing interval by a visual sign, in other words, by illuminating a lamp. However, the timing may be indicated by an audible sign. In such a case, the speaker amplifier 26 is operated by the output of the lamp driving circuit 14 (at F of FIG. 3) to send a particular sound or voice from the speaker 28. Of course, the vocable timing interval may be indicated by way of both or either one of the illuminated lamp and the sound. Furthermore, the receiving timing of the processing unit (or computer) has been described herein as being commenced upon extinction of the output of the mono-stable multivibrator. However, if desired, the receiving timing may be set at a point simultaneous with or slightly behind the generation of output by the monostable multivibrator, the speaker uttering a voice immediately after the lamp is lit.

While the invention has been described with reference to preferred embodiments thereof, it is understood that modifications may occur to those skilled in the art, which modifications may fall within the scope of the invention as defined by the claims appended hereto.

What is claimed is:

1. In a voice recognition system which recognizes the vocal utterances spoken by an individual into a microphone by converting the voice utterances into electrical signals, said electrical signals being further converted into a plurality of characteristics which are compared by a data processing device to stored characteristics, the improvement comprising:
   means responsive to a signal from said data processing device to provide a timing signal,
   means responsive to said timing signal for signalling to said individual a time start when vocal utterances are to be made into said microphone, and
   means responsive to said signalling means for generating a control signal for activating said data processing device at a time during which or slightly after a predetermined time period, the time start following which said vocal utterances are to be made and the time when said data processing device is activated being selected to reduce the standby time of said data processing device.

2. The system as defined in claim 1 wherein said means for signalling comprises means for generating visual and audible signals.

3. A system as set forth in claim 1, wherein said means for signalling comprises means for generating a visual signal.

4. A system as set forth in claim 1 wherein said means for signalling comprises means for generating an audible signal.

5. In a voice recognition system which recognizes the vocal utterances spoken by an individual into a microphone by converting the voice utterances into electrical signals, said electrical signals being transmitted over a line further converted into a plurality of characteristics which are compared by a data processing device to stored characteristics, the improvement comprising:
   distributing means for receiving said electrical signals prior to transmission over said line,
   means responsive to a signal from said data processing device to provide a timing signal,
   means responsive to said timing signal for signaling to said individual over said communications line via said distributing means a time start when vocal utterances are to be made into said microphone, and
   means responsive to said signaling means for generating a control signal for activating said data processing device at a time during or slightly after a predetermined time period, the time start following which said vocal utterances are to be made and the time when said data processing device is activated being selected to reduce the standby-time of said data processing device.

* * * * *